(12) United States Patent
Mueller et al.

(10) Patent No.: US 9,640,136 B2
(45) Date of Patent: May 2, 2017

(54) DISPLAY DEVICE FOR AN INTERIOR OF A MOTOR VEHICLE, AND METHOD FOR OPERATING THE LIKE

(71) Applicant: AUDI AG, Ingolstadt (DE)

(72) Inventors: Ulrich Mueller, Ingolstadt (DE); Marcus Kuehne, Beilngries (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/120,050

(22) PCT Filed: Mar. 11, 2015

(86) PCT No.: PCT/EP2015/000538
§ 371 (c)(1),
(2) Date: Aug. 18, 2016

(87) PCT Pub. No.: WO2015/135649
PCT Pub. Date: Sep. 17, 2015

(65) Prior Publication Data
US 2017/0053616 A1 Feb. 23, 2017

(30) Foreign Application Priority Data

Mar. 14, 2014 (DE) ........................ 10 2014 003 633

(51) Int. Cl.
*G09G 5/00* (2006.01)
*B60K 37/06* (2006.01)
(Continued)

(52) U.S. Cl.
CPC ............. *G09G 5/003* (2013.01); *B60K 35/00* (2013.01); *B60K 37/06* (2013.01);
(Continued)

(58) Field of Classification Search
CPC ............ B60K 37/06; B60K 2350/1096; B60K 2350/352; B60K 2350/962; G09G 5/0037;
(Continued)

(56) References Cited

U.S. PATENT DOCUMENTS 5,764,139 A * 6/1998 Nojima ................ G07C 5/0825
340/438
6,181,996 B1 * 1/2001 Chou ...................... B60K 37/00
340/439
(Continued)

FOREIGN PATENT DOCUMENTS

DE    696 13 653 T2    5/2002
DE  10 2005 021 142 A1  11/2006
(Continued)

OTHER PUBLICATIONS

German Office Action for Application No. 10 2014 003 633.2 dated Jul. 17, 2015.
(Continued)

*Primary Examiner* — Antonio A Caschera
(74) *Attorney, Agent, or Firm* — Staas & Halsey LLP

(57) ABSTRACT

An onboard computer, included in a display device, has a sensing unit that is designed to sense the presence of at least one occupant in the motor vehicle. A control unit, also included in the display device, is coupled to the sensing unit and is designed to retrieve data from the sensing unit and also vehicle-related and surroundings-related data from the onboard computer that are suitable for characterizing a past travel behavior and/or influencing a future travel behavior. Also included in the display device is a display unit controllable by the control unit and designed to display the vehicle-related data retrieved by the control unit which is designed to control the display unit such that it displays the vehicle-related and surroundings-related data at least in part until the sensing unit senses that there is at least no longer
(Continued)

a driver in the motor vehicle, to conveniently display a piece of information particularly for a stationary motor vehicle.

17 Claims, 1 Drawing Sheet

(51) Int. Cl.
    *B60K 35/00*     (2006.01)
    *G06F 3/03*     (2006.01)

(52) U.S. Cl.
    CPC   *B60K 2350/1096* (2013.01); *B60K 2350/352* (2013.01); *B60K 2350/962* (2013.01); *G06F 3/0304* (2013.01); *G09G 2320/06* (2013.01); *G09G 2354/00* (2013.01); *G09G 2380/10* (2013.01)

(58) Field of Classification Search
    CPC . G09G 5/006; G09G 2320/06; G09G 2380/10
    See application file for complete search history.

(56) References Cited

U.S. PATENT DOCUMENTS

| | | | | |
|---|---|---|---|---|
| 6,252,240 B1* | 6/2001 | Gillis | ............... | G01G 19/4142 |
| | | | | 250/221 |
| 7,852,323 B2* | 12/2010 | Parkinson | ............... | B60K 35/00 |
| | | | | 178/18.05 |
| 9,415,689 B2* | 8/2016 | Waller | ............... | B60K 35/00 |
| 2008/0129684 A1 | 6/2008 | Adams et al. | | |
| 2012/0268404 A1* | 10/2012 | Kuhn | ............... | B60K 35/00 |
| | | | | 345/173 |
| 2013/0282226 A1* | 10/2013 | Pollmann | ............... | B60Q 1/50 |
| | | | | 701/29.1 |
| 2015/0301175 A1* | 10/2015 | Rao | ............... | G01S 17/026 |
| | | | | 701/49 |
| 2016/0082952 A1* | 3/2016 | Kang | ............... | B60W 30/00 |
| | | | | 701/2 |

FOREIGN PATENT DOCUMENTS

| | | |
|---|---|---|
| DE | 10 2007 033 217 A1 | 1/2009 |
| DE | 10 2010 052 547 A1 | 5/2012 |
| DE | 10 2011 087 488 A1 | 6/2013 |
| DE | 10 2012 007 836 A1 | 10/2013 |
| DE | 102014003633.2 | 3/2014 |
| WO | PCT/EP2015/000538 | 3/2015 |

OTHER PUBLICATIONS

International Search Report for PCT/EP2015/000538 mailed Jun. 9, 2015.
English-language translation of International Preliminary Report for PCT/EP2015/000538 dated Oct. 3, 2016.
WIPO translation of Written Opinion for PCT/EP2015/000538 dated Aug. 8, 2016; 6pp.
WIPO partial-translation of International Preliminary Report on Patentability for PCT/EP2015/000538 dated Sep. 14, 2016.

\* cited by examiner

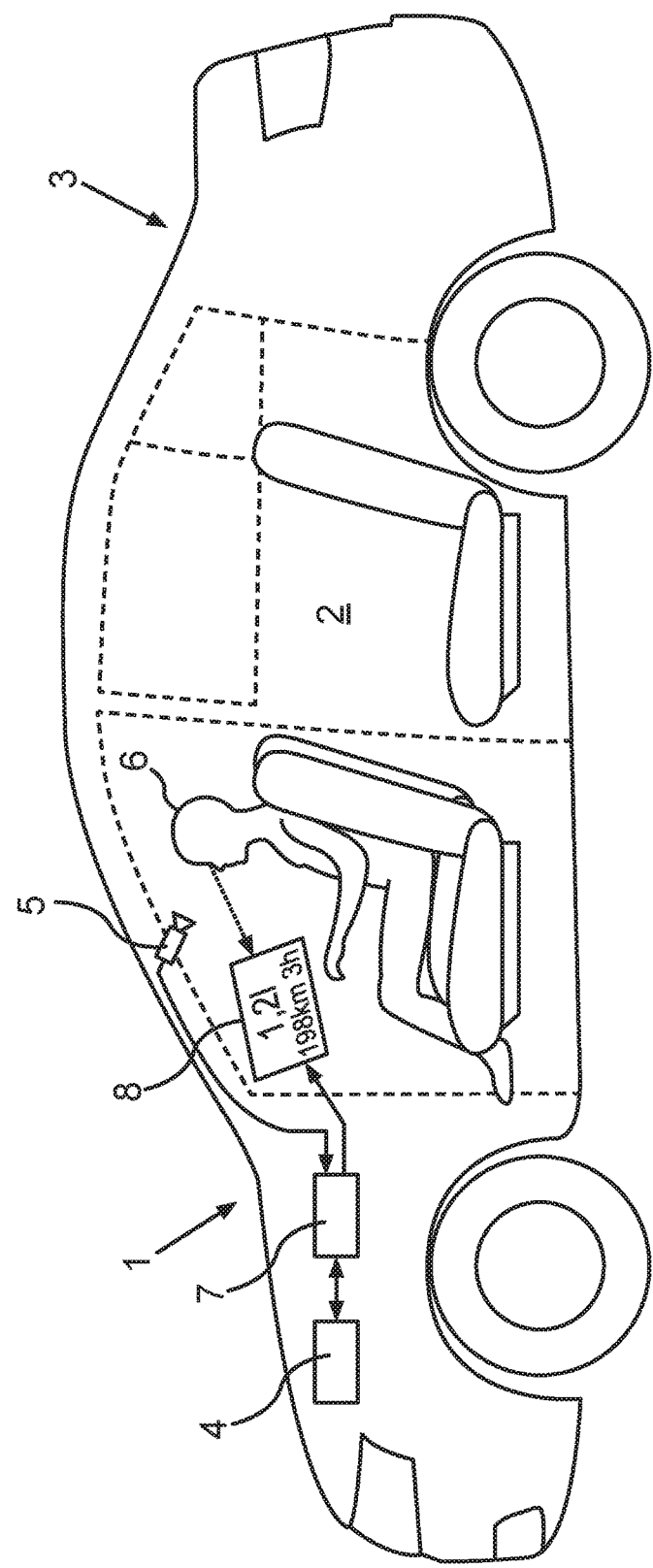

DISPLAY DEVICE FOR AN INTERIOR OF A MOTOR VEHICLE, AND METHOD FOR OPERATING THE LIKE

CROSS REFERENCE TO RELATED APPLICATIONS

This application is the U.S. national stage of International Application No. PCT/EP2015/000538, filed Mar. 11, 2015 and claims the benefit thereof. The International application claims the benefit of German Application No. 10 2014 003 633.2 filed on Mar. 14, 2014, both applications are incorporated by reference herein in their entirety.

BACKGROUND

Described below are a display apparatus for an interior of a motor vehicle and a method for operating such a display apparatus.

The users of modern motor vehicle are provided with a large amount of information. This is accomplished in part by the combination instrument of the motor vehicle or by a central display, which is often part of an infotainment system of the motor vehicle. Additional displays that can be removed from the motor vehicle are also common. In this case, the combination instrument and the central display are generally shutdown after the ignition of the relevant motor vehicle has been switched off or when an ignition key is withdrawn. This shutdown is also effected with a time delay if need be.

As such, DE 10 2007 033 217 A1 describes an infotainment appliance for a motor vehicle having a separate power supply. In this case, it is possible to set a time for which the infotainment appliance remains switched on even though an ignition lock has been switched off.

DE 10 2012 007 836 A1 describes an automobile that involves monitoring of whether a person is present in the automobile. In this case, a drive device is shutdown if it is identified that the person leaves or has left the automobile. Other loads, particularly comfort loads, can continue to be supplied with power in this case.

SUMMARY

Described below is a display device in which a piece of information is conveniently displayed particularly for a stationary motor vehicle.

The display device for an interior of a motor vehicle includes an onboard computer, a sensing unit that is designed to sense the presence of at least one occupant in the motor vehicle, a control unit that is coupled to the sensing unit and that is designed to retrieve data from the sensing unit and also vehicle-related and surroundings-related data from the onboard computer that are suitable for characterizing a past travel behavior and/or influencing a future travel behavior, and a display unit that is controllable by the control unit and that is designed to display the vehicle-related and surroundings-related data retrieved by the control unit. In this case, an onboard computer is understood to mean particularly an onboard computer having a navigation unit. The vehicle-related and surroundings-related data are particularly data that are suitable for characterizing a present and/or past state of the motor vehicle. A piece of surroundings information may also be included in this case. These are thus parameters that are available to the onboard computer and that have a significance for the driver or could have a significance at least on the basis of the data available to the onboard computer and general, possibly also driver-specific, requirements in road traffic. In other words, they are thus customer-relevant vehicle and surroundings data in contrast to data such as are of interest e.g. to a workshop.

In order to provide a particularly convenient display, the control unit is designed to control the display unit such that it displays the vehicle-related and surroundings-related data at least in part until the sensing unit senses that there is at least no longer a driver in the motor vehicle. In this case, there may also be provision for the vehicle-related and surroundings-related data to be displayed at least in part until the sensing unit senses that there is at least no longer a driver and/or front-seat passenger in the motor vehicle or until it senses that there is no longer an occupant in the motor vehicle. This has the advantage that the data are displayed only when they are actually needed, i.e. when a viewer is actually present. In addition, display of the data is thus possible when the driver with the ignition key has left the motor vehicle, for example, without a predetermined, inflexible time restriction taking hold in this case. There is therefore no possibility of the display of the data expiring at an importune moment, that is to say when an occupant is still viewing the data, resulting in increased reading convenience.

In an embodiment, there is provision for the control unit to be designed to also end the display of the vehicle-related and surroundings-related data by the display unit when a predetermined termination criterion is satisfied, particularly when a termination criterion that requires an action by an occupant is satisfied. This may particularly involve shutdown of the display unit by an appropriate switch. This has the advantage that the display of the data can be terminated as such it is perceived as a disturbance.

In another embodiment, there is provision for the sensing unit to include a contactless sensor, particularly an infrared sensor and/or a camera and/or a time-of-flight camera. This has the advantage that an occupant can be sensed reliably and accurately regardless of a force, that is to say particularly regardless of a weight of the occupant. In this case, the use of a camera or of a time-of-flight camera moreover also allows identification of specific occupants, which allows the data shown to be individualized.

In a particularly advantageous embodiment, there is provision for the display unit to be a combination instrument, particularly a user-programmable combination instrument. This may also be a display unit that is mechanically decouplable from the motor vehicle, for example a plug-in display of a combination instrument that can be taken along when leaving the motor vehicle. This has the advantage that specifically the driver can view the displayed data particularly conveniently. The driver is also saved from having to glance back and forth between different display devices, since the vehicle-related and surroundings-related data that are relevant to him are presented directly on the display unit that is optimized for him. Furthermore, it is therefore possible to save on a further display, for example a central display, if need be and therefore reduce costs.

There may also be provision for the control unit to be designed to control the display unit such that the vehicle-related and surroundings-related data to be displayed are displayed at least in part only after a drive motor of the motor vehicle has been switched off and/or an authentication device, particularly an ignition key that is required for operation of the motor vehicle, has been removed from a provided position in the motor vehicle or deactivated and/or after an end of a journey by the motor vehicle has been known by the control unit on the basis of predetermined criteria. In this case, an end of a journey by a motor vehicle can be identified by virtue of an ignition being switched off, a parking maneuver being identified, being stationary for a relatively long time, a trunk being opened and/or stopping at a location at which the motor vehicle has already been parked frequently in the past, for example. This has the advantage that the driver is not distracted during the journey by a display of data that are possibly of interest only after the end of a journey. This results in both increased safety and increased convenience.

In another embodiment, there is provision for the control unit to be designed to control the display unit in two different modes of operation. Firstly, this is a stationary mode of operation, in which the display unit is operated when a drive motor has been switched off and/or an authentication device that is required for operation of the motor vehicle has been removed from a provided position in the motor vehicle or deactivated and/or after an end of a journey by the motor vehicle has been identified by the control unit on the basis of prescribed criteria. Secondly, the display unit is operated in a travelling mode of operation when the criteria for the stationary mode of operation are not satisfied. In this case, the presentation of the respective data to be displayed differs in the selection of the data and/or in the color and/or in the size and/or in the brightness and/or in the position on the display unit in the two modes of operation. The display unit is thus changed over, which means that more information can be presented on the display unit, since only a relevant detail from the total available, in particular vehicle-related and surroundings-related, data is displayed in each case. It is also thus possible, in stationary or travelling mode of operation, to display not just different data in each case but also the same data in a different presentation with different weighting. By way of example, in travelling mode, it is thus possible to use up a large area of the display unit for displaying a speed and, by way of example, only a small section of the display unit for displaying an average consumption. In the stationary mode of operation, it is then possible to use the large area for displaying the average consumption, for example, and the small area for a further piece of information, for example, which is not displayed at all in the travelling mode of operation, for example. This also has the advantage that certain data can conveniently be displayed automatically in the stationary mode of operation, which data would otherwise first need to be selected by a driver or another user.

In a further advantageous embodiment, there is provision for the vehicle-related and surroundings-related data to include data from a last journey and/or vehicle state data, particularly at least one element from among journey route in a map presentation, time in a journey, kilometers traveled, consumption value, particularly consumption value for an electric power or a fuel, average speed, fill level of a battery, fill level of a tank, next charging time for a battery, and charging or fueling recommendation, particularly a charging or fueling recommendation on the basis of a forecast next journey, location of the closest charging or filling station, indication of a vehicle malfunction or servicing work required. In this case, the forecast next journey may particularly include a return journey to the starting point for the last journey. This has the advantage that the remaining occupant of the motor vehicle can gather the relevant data from the last journey or current state data for the motor vehicle at a glance. If need be, it can thus also plan the travel behavior for the next journey, particularly an involvement of the closest charging or filling station in a journey plan.

In this case, there may be provision for the vehicle-related and surroundings-related data to include comparison values with vehicle state data and/or times that come from previous journeys. This has the advantage that it is thus possible to sense trends or developments and, in particular, to conveniently present e.g. an influence of a travel style on a power and/or fuel consumption or a time of a journey.

A method is described below for operating a display apparatus for an interior of a motor vehicle having an onboard computer, having a sensing unit that is designed to sense the presence of at least one occupant in the motor vehicle, a control unit that is coupled to the sensing unit and that is designed to retrieve data from the sensing unit and also vehicle-related and surroundings-related data from the onboard computer that are suitable for characterizing a past travel behavior and/or influencing a future travel behavior, and having a display unit that is controllable by the control unit and that is designed to display the vehicle-related data retrieved by the control unit. In this case, the method first of all detects occupants in the motor vehicle using the sensing unit. To increase convenience, display of the vehicle-related data from the onboard computer by the display unit at least to some extent takes place until the sensing unit senses that there is at least no longer a driver in the motor vehicle. The aforementioned advantages are obtained in this case analogously to the display device.

In this case, there may be provision for the vehicle-related and surroundings-related data that are to be displayed to be displayed at least in part only after a drive motor of the motor vehicle has been switched off and/or an authentication device that is required for operation of the motor vehicle has been removed from a provided position in the motor vehicle or deactivated and/or after an end of a journey by the motor vehicle has been identified by the control unit on the basis of prescribed criteria.

Further features of the invention will emerge from the claims, the FIGURE and the description of the FIGURES. All features and combinations of features that are cited in the description above and the features and combinations of features that are cited in the description of the FIGURES below and/or are shown in the FIGURES alone can be used not only in the respectively indicated combination but also in other combinations or else on their own.

BRIEF DESCRIPTION OF THE DRAWINGS

These and other aspects and advantages will become more apparent and more readily appreciated from the following description of the exemplary embodiment and with reference to the appended drawing.

The single FIGURE is a schematic side view of a motor vehicle with a display device.

DETAILED DESCRIPTION OF THE PREFERRED EMBODIMENT

Reference will now be made in detail to the preferred embodiments, examples of which are illustrated in the accompanying drawings, wherein like reference numerals refer to like elements throughout.

The single FIGURE shows a schematic side view of a motor vehicle 3 with a display device 1. In this case, the display device 1 includes a sensing unit 5, which is embodied as a stereo camera by way of example, a control unit or controller 7, which obtains data about a presence of at least one occupant in an interior 2 of the motor vehicle 3 from the sensing unit 5 and at the same time can request vehicle-related data from an onboard computer 4. In this case, the control unit 7 controls a display (unit) 8 by which data, for example also in a graphically conditioned form, can be output to occupants 6 of the automobile 3, particularly to a driver and/or front-seat passenger. In the present example, a situation is thus shown in which the single occupant 6 of the motor vehicle 3 is the front-seat passenger, who is obtaining information about the last journey on the display unit 8.

In the example shown, a driver of the motor vehicle 3 has thus already got out and, in this example, has switched off ignition and motor and taken the ignition key with him. In this case, the display device 1 thus identifies that the journey has ended and now no longer displays data that are relevant during a journey, such as speed, motor speed, water temperature and turn signal activity, for example, on the display unit 8, which is a display of a combination instrument. Instead, in this example, data are now displayed that are retrospectively significant to the journey or important for planning the next journey. In this case, it is also possible for a journey route in a map presentation to be illustrated, for example. In the present example, the display unit 8 displays three data, namely an average consumption of 1.2 liters to begin with, a distance of 198 kilometers and a time of three hours. The largest area is taken up by the average consumption display in this case, since this is of particularly great interest in the example shown. A large portion of the display area can also be occupied by other data or information, however, for example by a graphical overview of the last journey in a map presentation. The other data are displayed in a relatively small form at the lower edge of the display unit 8 in this case. While the motor vehicle 3 was still in motion, a speed and/or motor speed display was also shown, for example, instead of the average consumption. By way of example, although the average consumption was indicated, this was possibly only as co-ordinate information, e.g. at the lower edge of the display unit 8.

This example illustrates three basic possibilities for designing a parting screen after the end of a journey. First, data such as the length of a route, for example, which in most cases are generally already displayed during the journey, can continue to be displayed without alteration. Secondly, data that are displayed during the journey can either be presented in enlarged form or in otherwise highlighted form, for example, after the journey if they are important or else may no longer be displayed if the data are no longer important. Finally, new data that are not displayed during travel, such as the three hours as the journey time in this case, for example, can also be presented in the display unit 8. In this case, the data presented in the display unit 8 are displayed for as long as the sensing unit 5 senses a driver or, in the present example, a front seat passenger or a driver as being present in the motor vehicle 3. In the example shown, the occupant 6 can thus view a summary of characterizing data for the last journey in a relaxed and convenient manner without requiring the presence of the driver or an ignition key or the like in any way in this case. The driver can thus e.g. use the ignition key, which is kept on a key ring with other keys, for example, to pursue other interests. Only when the occupant 6, that is to say in this case the front seat passenger likewise leaves the interior of the motor vehicle 3 is the display unit 8 then shut down, regardless of the time that has elapsed since the end of the journey was reached. Alternatively, the front seat passenger can also achieve this himself, for example by using a button to switch off the display unit 8. The display unit 8 may also be a display of a portable combination display, which means that the front seat passenger would then be able to take it with him when leaving the motor vehicle 3.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV,* 358 F3d 870, 69 USPQ2d 1865 (Fed. Cir. 2004).

The invention claimed is:

1. A display device for an interior of a motor vehicle having an onboard computer, comprising:
    at least one sensor configured to sense a presence of at least one occupant in the motor vehicle;
    a controller, coupled to the at least one sensor, configured to retrieve sensor data from the at least one sensor and vehicle-related and surroundings-related data from the onboard computer suitable in at least one of characterizing past travel behavior and influencing future travel behavior; and
    a display controllable by the controller to display the vehicle-related and surroundings-related data at least in part until the at least one sensor senses at least that a driver is not in the motor vehicle.

2. The display device as claimed in claim 1, wherein the controller is configured to end presentation of the vehicle-related and surroundings-related data by the display when a predetermined termination criterion is satisfied.

3. The display device as claimed in claim 2, wherein the controller is configured to end presentation of the vehicle-related and surroundings-related data by the display when the predetermined termination criterion requires an action by an occupant and is satisfied.

4. The display device as claimed in claim 1, wherein the at least one sensor includes a contactless sensor.

5. The display device as claimed in claim 4, wherein the at least one sensor includes at least one of an infrared sensor, a camera and a time-of-flight camera.

6. The display device as claimed in claim 1, wherein the display is a combination instrument.

7. The display device as claimed in claim 6, wherein the display is a user-programmable combination instrument.

8. The display device as claimed in claim 1, wherein the controller is configured to control the display to present the vehicle-related and surroundings-related data at least in part only after at least one of a drive motor of the motor vehicle has been switched off, an authentication device required for operation of the motor vehicle has been one of deactivated and removed from a provided position in the motor vehicle, and an end of a journey by the motor vehicle has been identified by the controller based on predetermined criteria.

9. The display device as claimed in claim 1,
    wherein the controller controls the display in one of two different modes of operation:
        a stationary mode of operation, when at least one of a drive motor of the motor vehicle has been switched off, an authentication device required for operation of the motor vehicle has been one of deactivated and removed from a provided position in the motor vehicle, and an end of a journey by the motor vehicle has been identified by the controller based on prescribed criteria, and
        a travelling mode of operation when not in the stationary mode of operation, and wherein the presentation of the vehicle-related and surroundings-related data differs in at least one of displayed data, color, size, brightness and position on the display in the two modes of operation.

10. The display device as claimed in claim 1, wherein the vehicle-related and surroundings-related data include at least one of
    a journey route in a map presentation,
    a time of a journey,
    kilometers traveled,
    a consumption value,
    average speed,
    a charge level of a battery,
    a fill level of a tank,
    a next charging time for the battery,
    one of a charging recommendation and a fueling recommendation based on a forecast next journey,
    a location of one of a closest charging station and a filling station, and
    an indication of one of a vehicle malfunction and servicing work required.

11. The display device as claimed in claim 10, wherein the vehicle-related and surroundings-related data include comparison values with at least one of vehicle state data, consumption data and times derived from previous journeys.

12. A method for operating a display device for an interior of a motor vehicle having an onboard computer, at least one sensor configured to sense a presence of at least one occupant in the motor vehicle, a controller configured to retrieve data from the at least one sensor and vehicle-related and surroundings-related data from the onboard computer suitable in at least one of characterizing past travel behavior and influencing future travel behavior, and a display unit controllable by the controller to display the vehicle-related data, comprising:
    sensing of occupants in the motor vehicle by the at least one sensor; and
    displaying of the vehicle-related data from the onboard computer by the display at least in part until the at least one sensor senses at least that a driver is not in the motor vehicle.

13. The method as claimed in claim 12, wherein the vehicle-related and surroundings-related data are displayed at least in part only after at least one of a drive motor of the motor vehicle has been switched off, an authentication device required for operation of the motor vehicle has been one of deactivated and removed from a provided position in the motor vehicle and an end of a journey by the motor vehicle has been identified by the controller based on prescribed criteria.

14. The method as claimed in claim 12, further comprising ending presentation of the vehicle-related and surroundings-related data by the display when a predetermined termination criterion requiring an action by an occupant is satisfied.

15. The method as claimed in claim 12,
    wherein said displaying displays the vehicle-related data differently depending on whether at least one criterion is met among the group consisting of a drive motor of the motor vehicle has been switched off, an authentication device required for operation of the motor vehicle has been one of deactivated and removed from a provided position in the motor vehicle, and an end of a journey by the motor vehicle has been identified by the controller based on prescribed criteria, and
    wherein differences in said displaying include at least one of displayed data, color, size, brightness and position on the display.

16. The method as claimed in claim 12, wherein the vehicle-related and surroundings-related data include at least one of
    a journey route in a map presentation,
    a time of a journey,
    kilometers traveled,
    a consumption value,
    average speed,
    a charge level of a battery,
    a fill level of a tank,
    a next charging time for the battery,
    one of a charging recommendation and a fueling recommendation based on a forecast next journey,
    a location of one of a closest charging station and a filling station, and
    an indication of one of a vehicle malfunction and servicing work required.

17. The method as claimed in claim 16, wherein the vehicle-related and surroundings-related data include comparison values with at least one of vehicle state data, consumption data and times derived from previous journeys.

* * * * *